United States Patent [19]
Perdec

[11] Patent Number: 6,153,975
[45] Date of Patent: Nov. 28, 2000

[54] DAY LIGHT HARNESS ADAPTOR

[75] Inventor: Roman Perdec, Burlington, Canada

[73] Assignee: The Louis Berkman Company, Steubenville, Ohio

[21] Appl. No.: 09/232,238

[22] Filed: Jan. 19, 1999

[51] Int. Cl.[7] .................................................. B60Q 1/02
[52] U.S. Cl. .......................... 315/82; 307/10.1; 307/10.8
[58] Field of Search ...................... 315/77, 82; 307/10.1, 307/10.8; 362/487, 498, 507

[56] References Cited

U.S. PATENT DOCUMENTS

| | | | |
|---|---|---|---|
| 4,280,062 | 7/1981 | Miller . | |
| 4,781,393 | 11/1988 | Jeter . | |
| 5,036,437 | 7/1991 | Macks | 315/159 |
| 5,193,894 | 3/1993 | Lietar et al. | 362/66 |
| 5,195,813 | 3/1993 | Brown | 315/77 |
| 5,420,480 | 5/1995 | Knepel . | |
| 5,473,515 | 12/1995 | Liu | 362/80.1 |
| 5,841,203 | 11/1998 | Chambers et al. | 307/10.8 |
| 6,005,300 | 12/1999 | Kelly | 307/10.1 |
| 6,015,219 | 1/2000 | Kelly | 362/267 |

OTHER PUBLICATIONS

Meyer Snow Plow Lights, Form No. 1–696, Jul. 1996.
Meyer Snow Plow Lights, Form No. 1–696R, Mar. 1997.
Meyer Snow Plow Lights, Form No. 1–705, Apr. 1998.

Primary Examiner—Don Wong
Assistant Examiner—Thuy Vinh Tran
Attorney, Agent, or Firm—Vickers, Daniels & Young

[57] ABSTRACT

An auxiliary vehicle light harness which includes a headlight connector to connect to a headlight, a power connector to connect to a headlight plug, an auxiliary light connector to connect to an auxiliary light, a switch to control power to the headlight and/or the auxiliary light, a daylight signal receiver to receive a signal generated by a light sensor, and a switch mechanism to control power from the power source to said auxiliary light when receiving a signal from said daylight signal receiver. The switch mechanism is designed to direct power from the power source to the auxiliary light or diverts power from the power source away from the auxiliary light. The light harness includes a power modifier to reduce the power from the power source to the auxiliary light.

56 Claims, 7 Drawing Sheets

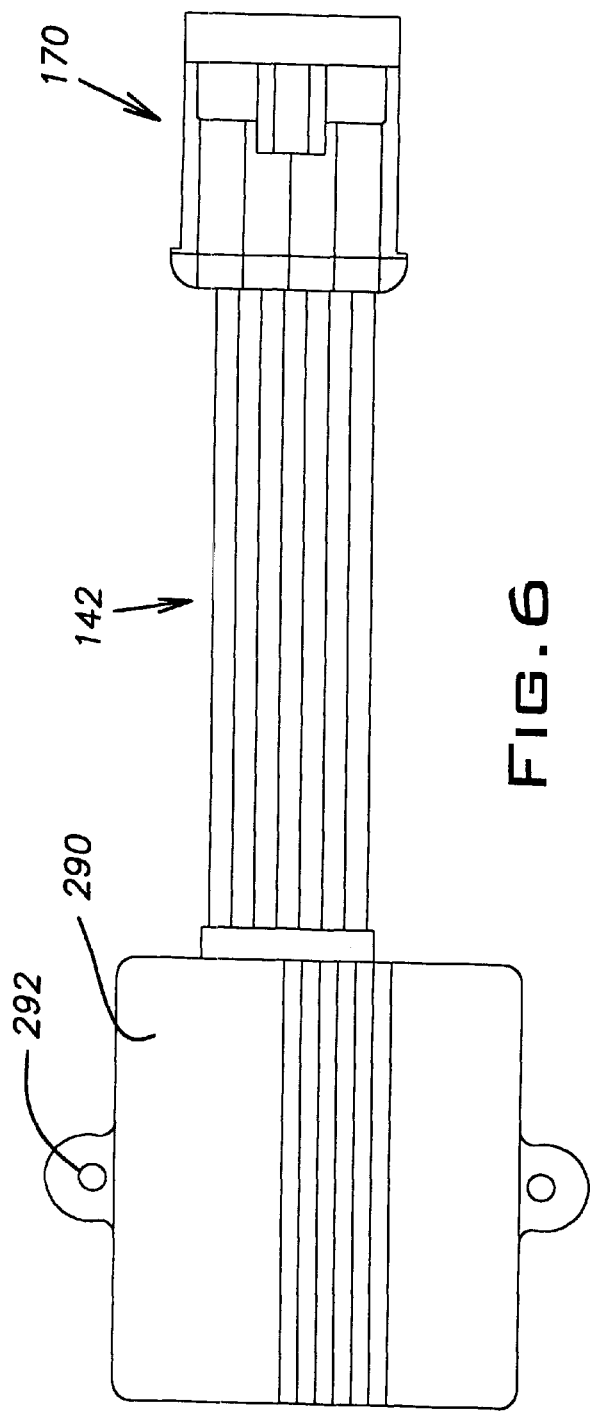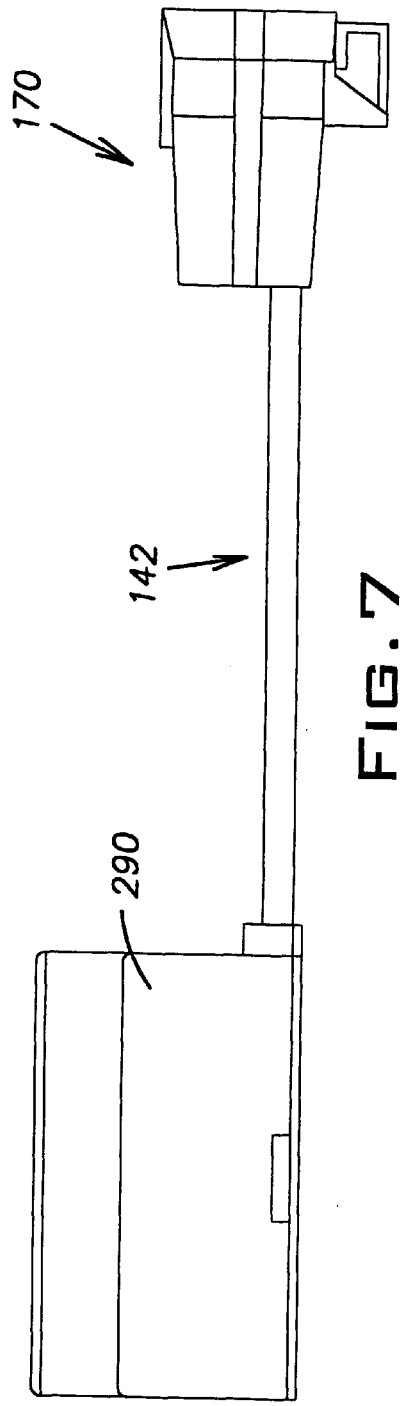

DAY LIGHT HARNESS ADAPTOR

The invention relates to the art of exterior lighting for vehicles and, more particularly, to an auxiliary light and wiring arrangement for connecting the auxiliary light to a vehicle for use in night and day lighting.

The present invention finds particular utility in connection with vehicles such as snow plows having an attached plow blade and, accordingly, is disclosed and described in detail hereinafter in connection with such use. However, it will be appreciated that the invention is applicable to other lighting and electrical connection uses.

BACKGROUND OF THE INVENTION

Auxiliary lights are light sources utilized to supplement a vehicle's standard lighting. These lights are often used, for example, on snowplow vehicles and on off-road vehicles. The lights for these uses are designed to either mount on the frame of a snow plow or some other external component of the vehicle capable of supporting the light. Although the use of auxiliary lights is becoming popular for various types of vehicles and vehicle applications, the type of available lights and the wiring harness used to connect these auxiliary to the vehicle's existing electrical system have many inherent problems.

Existing auxiliary light designs commonly utilize a conventional sealed beam headlight within the auxiliary light housing assembly. Due to the size and weight of the conventional sealed beam auxiliary lights, such auxiliary lights are undesirably heavy, thereby requiring stronger and costlier housing materials and/or reinforcement of the components in the auxiliary light housing. These heavy auxiliary lights also limit the mounting locations on a vehicle and can result in increased incidents of damage to the light and/or vehicle when the vehicle is operated in harsh and/or off-road environments. Another problem with existing auxiliary lights is the design of such lights and the difficultly in replacing parts. Replacement of a sealed beam headlight varies in difficulty based on the structure, age and condition of the auxiliary lighting assembly. The removal of the cover plates and support thereof is difficult and time consuming. Dismounting of the auxiliary light can also be difficult since such lights do not include integral mounting components, thereby requiring an additional support member, a bezel, and/or other components to secure the light to the housing. The auxiliary lights typically include pads which provide cushioning and reduce vibration of the light components. The location and number of components of the auxiliary light make it difficult to access, remove, replace and reseal the auxiliary light components. Many of the problems associated with auxiliary lights are addressed and overcome by the improved auxiliary light disclosed in U.S. Pat. No. DES. 399,326 and U.S. patent application Ser. No. 09/018,930, filed Feb. 5, 1998, both of which are incorporated herein by reference.

The wiring arrangements or harnesses for auxiliary light systems also have many problems. Traditionally,. the auxiliary lights were spliced into the existing wiring for the headlights of the vehicle. The splicing of the existing wiring caused many problems. Wires which were not properly spliced together become loose resulting in the auxiliary lights and/or headlights to malfunction. Improperly spliced wires also resulted in electrical shorts which could damaged the electrical system of the vehicle and/or cause a malfunction with one or more electrical systems of the vehicle, including the headlights and/or auxiliary lights. The splicing of OEM wiring of the vehicle further resulted in the voiding of many of the warranties for the OEM wiring of the vehicle and/or headlights of the vehicle. The splicing of the auxiliary light system into the existing electrical system of the vehicle further made it difficult to connect and disconnect the auxiliary lights when the auxiliary lights needed to be repaired or were not needed. Such connecting and disconnecting also resulted in increased wear and damage to the spliced region of the vehicle electrical system thereby resulting in increased incidents of failure or malfunction of the vehicle electrical system.

In view of the problems associated with splicing auxiliary lights to the existing electrical system of a vehicle, auxiliary light harnesses were developed to eliminate the need to splice the OEM wiring to the headlights of a vehicle. One such electrical harness is disclosed in U.S. Letters Pat. No. 4,280,062 issued to Richard R. Miller. The Miller harness connects the headlights of a vehicle and two auxiliary lights to a single existing vehicle plug that is connected to a vehicle headlight power source. The Miller harness requires the existing headlight wiring harness to be disconnected prior to using the harness. Therefore, when using the Miller harness, a portion of the OEM wiring of the vehicle is not used and can be discarded. Although the Miller harness overcomes some of the problems associated with splicing OEM wiring for the headlights of the vehicle, several problems exist when using the Miller harness.

The Miller harness is designed to connect two basic auxiliary lights to a vehicle's headlight power source. The Miller harness cannot be used with auxiliary lights that house emergency and/or turning signal lights along with the beam light. Consequently, the Miller harness is limited for use with only certain type of auxiliary lights. The Miller harness is designed to provide power to the vehicle headlights and/or the auxiliary lights from a single vehicle headlight power source. The current drawn on the single vehicle headlight power source during the operation of both headlights and/or auxiliary lights can result in an overload and/or damage to the wiring of the single vehicle headlight source caused by too much current being drawn through the wiring. The Miller harness, during installation, requires a cable containing at least six wires to be inserted through the fire wall of the vehicle so that a six pole switch can be mounted on or near the dashboard of the vehicle. Due to the large number of wires, a large hole must be drilled through the fire wall of the vehicle. Such size a hole can be difficult to form in the fire wall and can result in damage to the vehicle. The switch used in the Miller harness required six or more wires to be connected in a certain arrangement for the switch to operate properly. Improper connection of the wires to the switch results in a short in the harness which could cause damage and/or malfunction to the electrical system of the vehicle and/or damage to the headlights and/or auxiliary lights. In addition, due to the multiple wires connected to the switch of the Miller harness, it is difficult to locate a damaged or faulty wire to the switch and/or replace a wire to the switch. Shorting of the electrical system of the Miller harness and/or vehicle electrical system can occur during the use of the Miller harness. When using the Miller harness, only one of the vehicle headlight power sources is connected to the harness. The other vehicle headlight power source remains disconnected. During the operation of the vehicle, moisture, dirt, etc. can collect in the unused headlight power source and can cause a short during the operation of the vehicle. Furthermore, when the auxiliary headlights are disconnect from the Miller harness and the harness is not removed from the vehicle, the connectors for the auxiliary lights can collect moisture, dirt, etc. which can cause a short during the operation of the vehicle. The Miller harness also cannot be partially or totally detached and reattached in the vehicle without significant difficulty. When the Miller harness is to be repaired and requires the repaired portion to be removed from the vehicle, the complete harness must be removed from the vehicle. This requires the multiple wires to the switch to be pulled through the vehicle fire wall and out of the engine compartment without damaging the wires. When the Miller harness is to be reattached to the vehicle, the multiple wires must be inserted through the fire wall without damaging the wires and properly reattached to the switch.

The problems associated with auxiliary light harnesses are addressed and overcome by the improved auxiliary light harness disclosed in U.S. patent application Ser. No. 09/159,035 filed Sep. 23, 1998, which is incorporated herein by reference. The auxiliary light harness has electrical connectors which connect to the OEM wiring of a vehicle headlight and to the OEM wiring for the power source of the vehicle headlight. The auxiliary light harness has two connectors whereby one of the connector connects to the vehicle headlight and the other connector connects to the power source of the vehicle headlight. The auxiliary harness design utilizes all of the OEM wiring of a vehicle and none of the OEM wiring of the vehicle is discarded or only partially utilized when the auxiliary light harness is attached to the vehicle. The auxiliary light harness also can be integrated with the turning signals and/or emergency lighting of the vehicle. The auxiliary light harness includes solid state circuitry to reduce the complexity of installation, operation, maintenance and repair of the auxiliary light harness. The auxiliary light harness has a modular unit which allows the auxiliary lights to be easily detached and removed from the vehicle without having to dismantle and remove the complete auxiliary light harness from the vehicle. The auxiliary light system is connected to the vehicle power source to reduce the occurrences of the auxiliary lights inadvertently draining the power of the vehicle's battery. The auxiliary light harness incorporates special connectors to ensure that the connectors will not inadvertently become disconnected during operation, or the circuitry becoming damaged and/or creating a short in the auxiliary light harness.

Although the improved light harness overcomes many of the problems of standard light harnesses, the improved light harness cannot be used with daytime running lights. In certain countries and states, vehicles that are operated during the daytime must have daytime running lights. When a snow plow blade is attached to a vehicle, the snow plow blade covers or obstructs the daytime running lights. Several countries and states require that the auxiliary lights be activated during the daytime to replace the daytime running lights. In some jurisdictions, the activation of the auxiliary lights satisfies the daytime running light requirements. However, in several jurisdictions, the low beam auxiliary lights are too bright. As a result, the use of low beam auxiliary lights during the day violates certain country and states laws. In addition, the use of low beam auxiliary lights during the day time reduces the life of the auxiliary lights thereby causing more frequent bulb replacement.

In view of the deficiencies of prior auxiliary light harnesses, there is a need for an auxiliary light harness that can be used with a wide variety of auxiliary lights, which eliminates the need to splice the wiring to the headlights of a vehicle, which is easy to install in a vehicle, which reduces the occurrences of overloading the OEM wiring of the vehicle, which protects against shorting of an electrical circuit, which one or more components of the harness can be easily detached and reattached to the vehicle, which components of the harness can be easily accessed for easy repair and/or replacement, which can be integrated which the daytime running light circuitry of a vehicle, which reduces the lumen output of the auxiliary lights during daytime running, and which increases the bulb life of daytime running auxiliary lights.

SUMMARY OF THE INVENTION

An auxiliary light harness in accordance with the present invention overcomes the foregoing and other problems heretofore encountered in connection with the use of prior auxiliary light harnesses. The auxiliary light harness incorporates a simple modular design that simplifies the installation of the auxiliary light harness, improves the safety and reliability of the auxiliary harness, and enables the auxiliary lights to be run in daytime running mode.

In accordance with the present invention, there is provided an auxiliary light harness for connecting auxiliary headlights such as snow plow lights to the OEM wiring of a vehicle and will be describe with particular reference thereto; however, the invention has broader applications and can be use to connect many types of auxiliary electrical systems and lights to the OEM wiring of a vehicle.

In accordance with the principle feature of the present invention, the auxiliary light harness includes electrical connectors designed to connect to the OEM wiring of a vehicle headlights and to the OEM wiring for the power source of the vehicle headlights. The vehicle headlights include a connector which connects to the power source of a vehicle. The auxiliary light harness includes two connectors whereby one of the connectors is connected to the vehicle headlight and the other connector is connected to the power source to which the vehicle headlight was originally attached. The auxiliary light harness also preferably includes connectors to connect to the daytime running lights of the vehicle and to the power source to which the daytime running light were originally attached. However, the wiring to the daytime running lights need not be integrated into the auxiliary harness circuitry. Consequently, the auxiliary harness design utilizes all of the OEM wiring of a vehicle and none of the OEM wiring of the vehicle is discarded or only partially utilized when the auxiliary light harness is attached to the vehicle.

In accordance with still another feature of the present invention, the auxiliary light harness is designed to be integrated with the turning signals and/or emergency lighting of the vehicle. In this regard, the auxiliary headlights which are attached to the vehicle include turn signals and/or emergency lighting can be attached to the auxiliary harness so that such turning signals and/or emergency lights are activated when the operator of the vehicle activates such turning signals and/or emergency lights. As a result, the auxiliary light harness can connect a variety of auxiliary lights to the vehicle.

In accordance with still another feature of the present invention, the auxiliary light harness includes circuitry which reduces the complexity of installation, operation, maintenance and repair of the auxiliary light harness. In one preferred design, the auxiliary light harness includes solid state circuitry which controls the activation and deactivation of the auxiliary lights, and/or the intensity of the light from the auxiliary lights. The solid state circuitry increases the reliability of the auxiliary light harness circuitry and reduces the number of wires needed to connect the auxiliary light harness to the OEM wiring of the vehicle. The solid state circuitry also reduces the number of wires which must be threaded through the fire wall of a vehicle into the auxiliary lighting switch located in the operator driving compartment. The reduced number of wires needed for the switch and the overall circuitry of the auxiliary light harness greatly simplifies the installation, maintenance, repair, and operation of the auxiliary light harness, and enhances the reliability of the auxiliary light harness.

In accordance with still yet another feature of the present invention, the auxiliary light harness is designed to be a modular unit which allows the auxiliary lights to be easily detached and removed from the vehicle without having to dismantle and remove the complete auxiliary light harness from the vehicle. This modular design of the auxiliary light harness also allows for components of the auxiliary light harness to be easily removed and replaced when in need of repair or replacement without having to completely remove or dissemble the auxiliary light harness from the vehicle.

In accordance with another feature of the present invention, the auxiliary light system is connected to the vehicle power source in a manner as to reduce the occurrences of the auxiliary lights inadvertently draining the power of the vehicle's battery. Preferably, the auxiliary light harness is connected in series to the ignition switch of the vehicle such that the ignition switch must be activated prior to the auxiliary lights being activated. When the ignition switch of the vehicle is activated, the vehicle's engine is typically running, thereby supplying sufficient power to the vehicle. During the operation of the engine, the activation of the auxiliary light system can be activated without draining the battery power of the vehicle.

In accordance with still yet another feature of the present invention, the auxiliary light harness can be designed to allow the vehicle's headlights or the auxiliary lights of the vehicle to be activated; or allow both the auxiliary lights and the headlights of the vehicle to be activated. When the auxiliary light harness is used to attach snowplow lights to a vehicle, the headlights of the vehicle are typically deactivated when the snowplow lights are activated since the snowplow blade typically obstructs the light from the headlights. Therefore, it is desirable to deactivate the headlights of the vehicle upon activation of the plow lights so as to preserve the life of the vehicle headlights. In other applications wherein the auxiliary lights are fog lights, it is desirable to have both the fog lights and the headlights simultaneously activated to increase the number of lumens generated by the vehicle.

In accordance with another feature of the present invention, the auxiliary light harness incorporates circuitry to operate the auxiliary lights for daytime running. The operation of the auxiliary lights for daytime running can be manually or automatically operated. In one preferred embodiment, the auxiliary lights manually activated during day light hours and set to a low beam mode during operation. The low beam mode can be manually or automatically controlled. If the low beam mode is manually controlled, the high and low beam switch in the vehicle is controlled by the operator to set the beam mode of the auxiliary lights. The auxiliary light harness preferably is integrated with the high and low beam switch for the vehicle headlights so that the same switch can be use to control the beam mode of the auxiliary lights when the auxiliary lights are activated. In another preferred embodiment, the beam mode of the auxiliary lights is automatically controlled. In this arrangement, the auxiliary harness includes a light sensor and/or is connected to an existing light sensor on the vehicle. The light sensor is used to set the beam mode of the auxiliary lights. When the light sensor detects light during day light hours, the light sensor sends a signal to the auxiliary harness circuitry to set the auxiliary lights to low beam mode. The signal from the light sensor can also be used to enable the use of the auxiliary light harness during day light hours, automatically activate the auxiliary lights during day light hours and/or automatically activate the auxiliary lights during night time hours.

In accordance with still another feature of the present invention, the auxiliary light harness incorporates circuitry to alter the intensity of light produces by the auxiliary lights. The operation of auxiliary lights during the day light hours can produce unnecessarily bright light during operation. The daytime running lights are intended to draw attention to a vehicle during the day. The operation of high intensity lights is unnecessary to draw attention to a vehicle. In some instances, the operation of bright lights during the day can cause unwanted glare for the operator and/or for other vehicle operators. In addition, most auxiliary lights burn out at a faster rate when operated in high beam mode. The reduction of power to the auxiliary light can increase the life of the bulb. The auxiliary light harness includes circuitry to enable the auxiliary light to be operated at low beam mode. The low beam mode setting can be manually and/or automatically controlled.

In accordance with still yet another feature of the present invention, the auxiliary light harness incorporates circuitry to reduce the intensity of light produces by the auxiliary lights in low beam mode. In several regions of the world, regulations exist concerning the brightness of daytime running lights. Typically, these regulations require that the daytime running lights be 10–50% less bright than headlights operated in the low beam mode. The auxiliary light harness includes circuitry to reduce the intensity of the auxiliary lights to produces a light intensity that is less than the light intensity at low beam mode. In one preferred embodiment, the intensity of the auxiliary lights is reduces by altering the modulation of current and/or voltage to the auxiliary lights. The altered modulation or current and/or voltage to the auxiliary lights reduces the power to the auxiliary lights over time thereby resulting in a reduction of lumens produced by the auxiliary lights. In another embodiment, the current and/or voltage to the auxiliary lights is reduced thereby reducing the power to the auxiliary lights and causing a reduction of lumens produced by the auxiliary lights. In yet another preferred embodiment, the auxiliary light harness can be manually adjusted to control the amount of reduction in lumens produced by the auxiliary lights. In one arrangement, the auxiliary light harness includes a variable resistor that can be manually adjusted to regulate the lumens produced by the auxiliary lights.

In accordance with a further feature of the present invention, the auxiliary light harness includes circuitry to draw or divert power from the auxiliary lights to result in a reduction of power to the auxiliary lights. In one preferred embodiment, a switch mechanism is used to periodically ground the power to the auxiliary lights thereby reducing the power to the lights.

In accordance with a still a further feature of the present invention, the auxiliary light harness operates the auxiliary lights in daytime running mode during daylight hours and when the headlights and/or auxiliary lights are turned off. The operation of the daytime running mode for the auxiliary lights is only necessary during daytime hours. The auxiliary light harness circuitry is designed to deactivate the daytime running circuitry when the light sensor does not detect daylight. The auxiliary harness circuitry preferably includes a device to deactivate the daytime running mode circuitry upon detection of the activation of the headlights and/or auxiliary lights by an operator. This circuitry design prevents the primary circuitry for the headlights/auxiliary lights to simultaneously operate with the daytime running mode circuitry. In one preferred embodiment, the light detector only activates the daylight running circuitry upon detection of actual light, not artificial light. In another preferred embodiment, the daytime running mode circuitry includes a switch to deactivate, isolate or otherwise disable the daytime running mode circuitry upon detection of the activation of the headlights or auxiliary lights of a vehicle.

In accordance with still yet a further feature of the present invention, the auxiliary light harness is integrated with the circuitry of the daytime running lights of a vehicle. The auxiliary light harness can be designed to deactivate the daytime running lights when the auxiliary lights are connected to the vehicle. Alternatively, the auxiliary light harness can be designed to enable the use of both the daytime running lights and the auxiliary lights during day light hours. The activation and/or deactivation of the daytime running lights can be manual or automatic.

In accordance with yet a further feature of the present invention, a modular daytime running light circuit can be attached to an existing auxiliary light harness to enable daytime running light operation of the auxiliary lights. The circuit is designed to be connected to the existing auxiliary light harness circuitry and to cooperate with the existing circuitry in controlling the auxiliary lights. In one preferred embodiment, the daytime running light circuit is spliced into the circuitry of the existing auxiliary light harness. In another embodiment, the daytime running light circuit is a solid state circuit to simplify the installation, maintenance, repair, and operation of the circuit and to enhance the reliability of the circuit.

In accordance with another feature of the present invention, the auxiliary light harness incorporates special connectors to ensure that the connectors will not inadvertently become disconnected during operation. Preferably, the connectors include a lock system such as a snap lock, which ensures that the connectors are properly secured together and to further prevent the connections from loosening or becoming disconnected during the operation of the vehicle. The connectors are also preferably designed to allow the connectors to be connected in only one manner, so as to prevent an improper connection. In this manner, the connectors are specially shaped so that the connectors can only be attached together in one manner.

In accordance with yet another feature of the present invention, the auxiliary light harness includes a seal arrangement to prevent foreign materials from damaging and/or causing a short in the circuitry of the auxiliary light harness. Preferably, the connectors utilized in the auxiliary light harness include seals that inhibit and/or prevent liquid, dust, dirt and/or other debris from contacting the electrical connections of the auxiliary light harness. In one preferred design, the connectors include rubber, plastic, and/or Teflon seals to prevent foreign materials from interacting with the electrical connections of the vehicle light harness. The seals help prevent corrosion of the electrical connections, bad connections between the electrical connections, shorting of the electrical connections and the like.

In accordance with another feature of the present invention, the connectors include plugs which are utilized when the auxiliary lights are disconnected and removed from the vehicle. After the auxiliary lights are disconnected from the auxiliary light harness, the electrical connectors of the auxiliary light harness are exposed to the environment. The connector plugs are designed to connect to the ends of these electrical connections to seal the electrical connections from the environment, thereby inhibiting and/or preventing corrosion of the electrical connections, and/or other debris from depositing on the electrical connections which may impair the operation of the auxiliary light harness when the auxiliary lights are once again attached to the harness. Preferably, these plugs are also used for the ends of the connectors on the auxiliary light harness that connect to the auxiliary light connectors so as to also prevent corrosion and/or debris depositing on and/or in the electrical connections while the auxiliary lights are being stored.

It is accordingly a principal object of the present invention to provide an improved auxiliary light harness to be used in conjunction with a vehicle which is simple to install and operate.

Another object of the present invention is the provision of an auxiliary light harness which can be used with a wide variety and style of auxiliary lights.

Still another object of the present invention is the provision of an auxiliary light harness which utilizes the OEM wiring of a vehicle headlight system without the need to splice the OEM wiring to the vehicle headlights.

Yet another object of the present invention is the provision of an auxiliary light harness which utilizes all of the OEM wiring for the headlight system of a vehicle.

Still yet another object of the present invention is the provision of an auxiliary light harness which reduces the occurrence of overloading the OEM wiring of the vehicle during the operation of the auxiliary lights.

Another object of the present invention is the provision of an auxiliary light system which operates the auxiliary lights for daytime lighting.

Still another object of the present invention is the provision of an auxiliary light system which reduces the intensity of the light from the auxiliary lights during daytime running.

Still yet another object of the present invention is the provision of an auxiliary light system which increases the life of the auxiliary lights during daytime running.

Yet a farther object of the present invention is the provision of an auxiliary light system which can be manually adjusted to regulate the intensity of the auxiliary lights.

Yet another object of the present invention is the provision of an auxiliary light system which includes a separate modular component that enables the daytime running of auxiliary lights.

Another object of the present invention is the provision of an auxiliary light system which protects against the shorting and/or damage of the electrical system of the auxiliary light harness.

Still another object of the present invention is the provision of an auxiliary light harness which allows for one or more of the components of the harness to be easily attached and reattached to the vehicle without having to substantially remove the harness from the vehicle.

Yet another object of the present invention is the provision of an auxiliary light system which can be easily maintained and repaired.

Still yet another object of the present invention is the provision of an auxiliary light system which reduces the occurrences of the components of the harness being incorrectly connected together.

Still a further object of the present invention is the provision of an auxiliary light system which reduces the occurrence of components becoming inadvertently disconnected during the operation of the vehicle.

Another object of the present invention is the provision of an auxiliary light harness which includes a modular design that simplifies the installation, repair, maintenance and operation of the auxiliary lights on a vehicle.

Yet another object of the present invention is the provision of an auxiliary light harness which reduces the occurrence of inadvertent power drain of a vehicle's battery during the operation of the auxiliary lights.

Yet still another object of the present invention is the provision of an auxiliary light harness which includes solid state circuitry to improve the reliability and simplicity of operation, maintenance, installation, and repair or the auxiliary vehicle light harness.

Another object of the present invention is the provision of an auxiliary light harness that includes a sealing arrangement to reduce degradation of the electrical circuitry and/or interface with electrical connections.

These and other objects and advantages will become apparent from the following description used to illustrate the preferred embodiment of the invention when read in conjunction with the accompanying drawings.

BRIEF DESCRIPTION OF THE DRAWINGS

FIG. 6 is a top elevation view of the daytime running controller of the present invention;

FIG. 7 is a side elevation view of the daytime running controller of FIG. 6;

DESCRIPTION OF THE PREFERRED EMBODIMENTS

Figure 1:
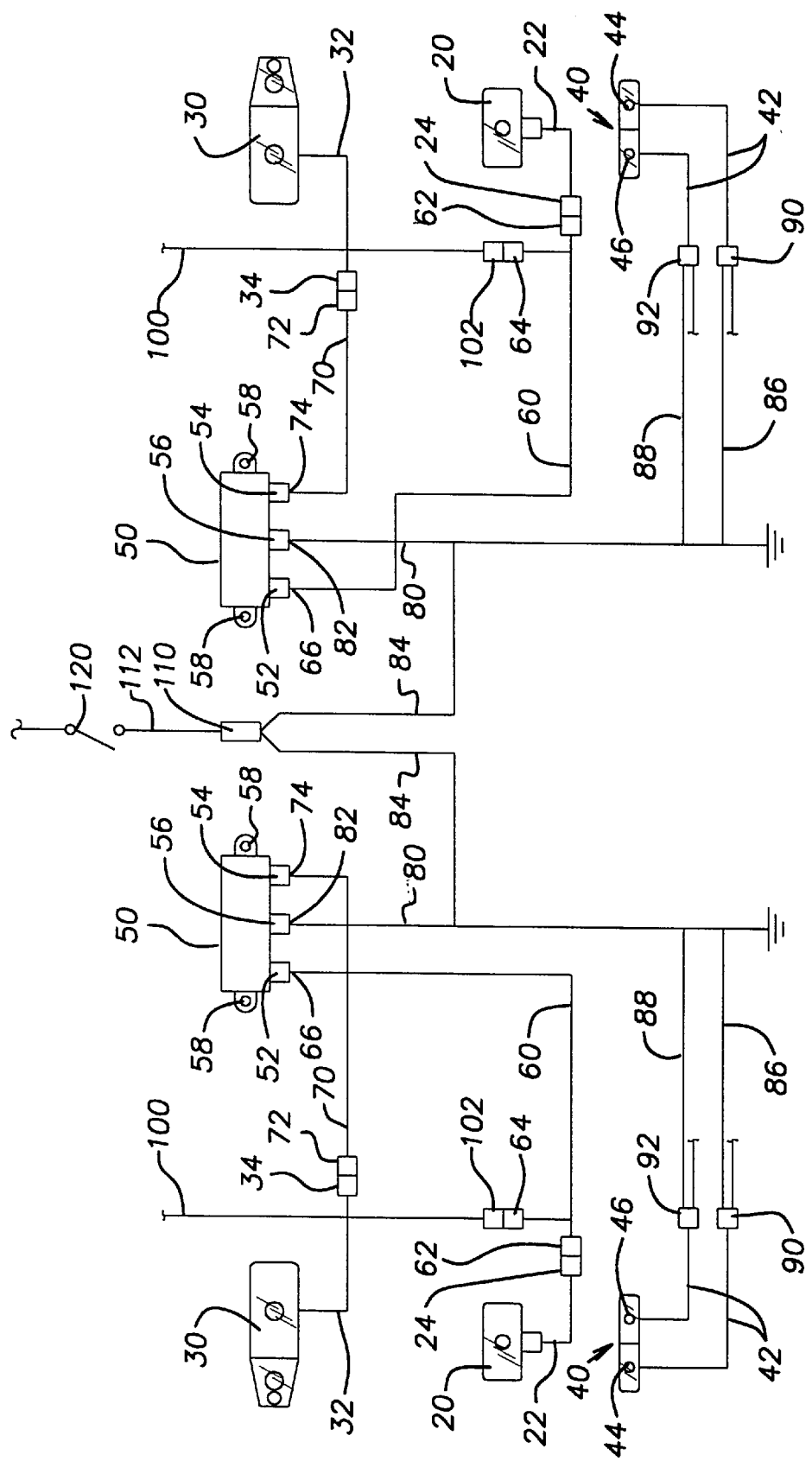
FIG. 1 is a schematic view of a prior art auxiliary light harness and components attached thereto in accordance with the present invention.

Referring now to the preferred embodiment of the drawings, wherein the showings are for the purpose of illustrating a preferred embodiment of the invention only and not for the purpose of limiting the invention, FIG. 1 is schematic drawing of a prior art auxiliary light harness 10 in accordance with the present invention. Auxiliary harness 10 is designed to electrically connect auxiliary lights 30 to the electrical system of a vehicle. As specifically illustrated in FIG. 1, auxiliary lights 30 are auxiliary headlights which are electrically connected to the headlight electrical circuitry of a vehicle.

In a typical vehicle, the vehicle includes two headlights 20 wherein each of the headlights includes wiring 22 which electrically connects to the light in the headlight at one end and includes a connector 24 at the other end. Headlight wire connector 24 is electrically connected to the OEM headlight wiring 100 of the vehicle. Specifically, connector 24 connects to connector 102 of the OEM headlight wiring. The vehicle also typically includes a turn/emergency light 40 which has a turn light 44 and an emergency light 46. Wiring 42 connects turn light 44 and emergency light 46 to the OEM light wiring of the vehicle.

Auxiliary light harness 10 is designed to connect to the headlight wiring connectors, turn and emergency light wiring and to the OEM headlight wiring connectors. Once the auxiliary light harness 10 is properly connected to the electrical system of a vehicle, all the OEM wiring to the headlights of the vehicle is operational and used by the harness.

Referring to FIG. 1, the auxiliary light harness is connected to the OEM headlight wiring of the vehicle and to the turn light and emergency light wiring of the vehicle. When the auxiliary light harness 10 is installed, headlight wiring connector 24 is disconnected from OEM headlight wiring connector 102. Harness headlight wiring connector 62 is then connected to the headlight wiring connector 24. Furthermore, harness headlight power connector 64 is connected to OEM headlight wiring connector 102. Connectors 62 and 64 are part of harness headlight wiring 60 which connects to a harness control module 50. Harness headlight wiring 60 includes a port connector 66 which connects to module headlight port 52 of control module 50. As illustrated in FIG. 1, each set of auxiliary lights 30 and headlights 20 has its own harness control module 50. Typically, harness 10 will only include two harness control modules since most vehicles typically have only two headlights.

Auxiliary light 30 includes auxiliary light wiring 32 which connects at one end to the lights in auxiliary light 30 and at the other end includes a wiring connector 34. Wiring connector 34 is connected to harness auxiliary light connector 72 which in turn is connected to one end of harness auxiliary light wiring 70. At the other end of auxiliary light wiring 70 is a port connector 74 which connects to auxiliary light port 54 of control module 50.

Turn light/emergency light 40 are electrically connected to OEM wiring. Harness switch wiring 80 includes two wires 86, 88 which connect to wiring 42 by connectors 90, 92. The electrical connectors can take any form which creates an electrical connection between turn/emergency light wiring 42 and turn light wire 86 and emergency light wire 88. Preferably, the connectors are electrical splices. Harness switch wiring 80 is connected to include a port connector 82 which connects to module switch port 56 of control module 50. Harness switch wiring 80 also includes a ground connection and switch wire 84.

As shown in FIG. 1, the switch wires 84 from each of the two control modules 50 are connected together by switch wire connector 110. The other end of switch wire connector 110 is connected to a switching wire 112 which terminates at one end of auxiliary light switch 120.

The auxiliary headlights 30 can be a variety of different styles and types of headlights. One preferable type of auxiliary headlight is disclosed in the assignee's U.S. Pat. No. DES. 399,326 and U.S. patent application Ser. No. 09/018,930, filed Feb. 5, 1998. The manner in which the auxiliary headlights can be connected to the vehicle will depend on the style and type of the vehicle and the style and type of auxiliary headlight. One preferable arrangement for mounting the auxiliary headlight is disclosed in assignee's U.S. patent application Ser. No. 09/018,930.

As illustrated in FIG. 1, control module 50 includes a module mount hole 58. Mount hole 58 is designed to allow the control modules to be secured in the interior of a vehicle by bolts, screws or the like. Preferably, the control module 50 is mounted near each headlight of the vehicle. As can be appreciated, the wiring for the electrical harness may be secured by ties, clamps and the like to ensure that the wiring is secured in place during the operation of the vehicle.

Figure 2:
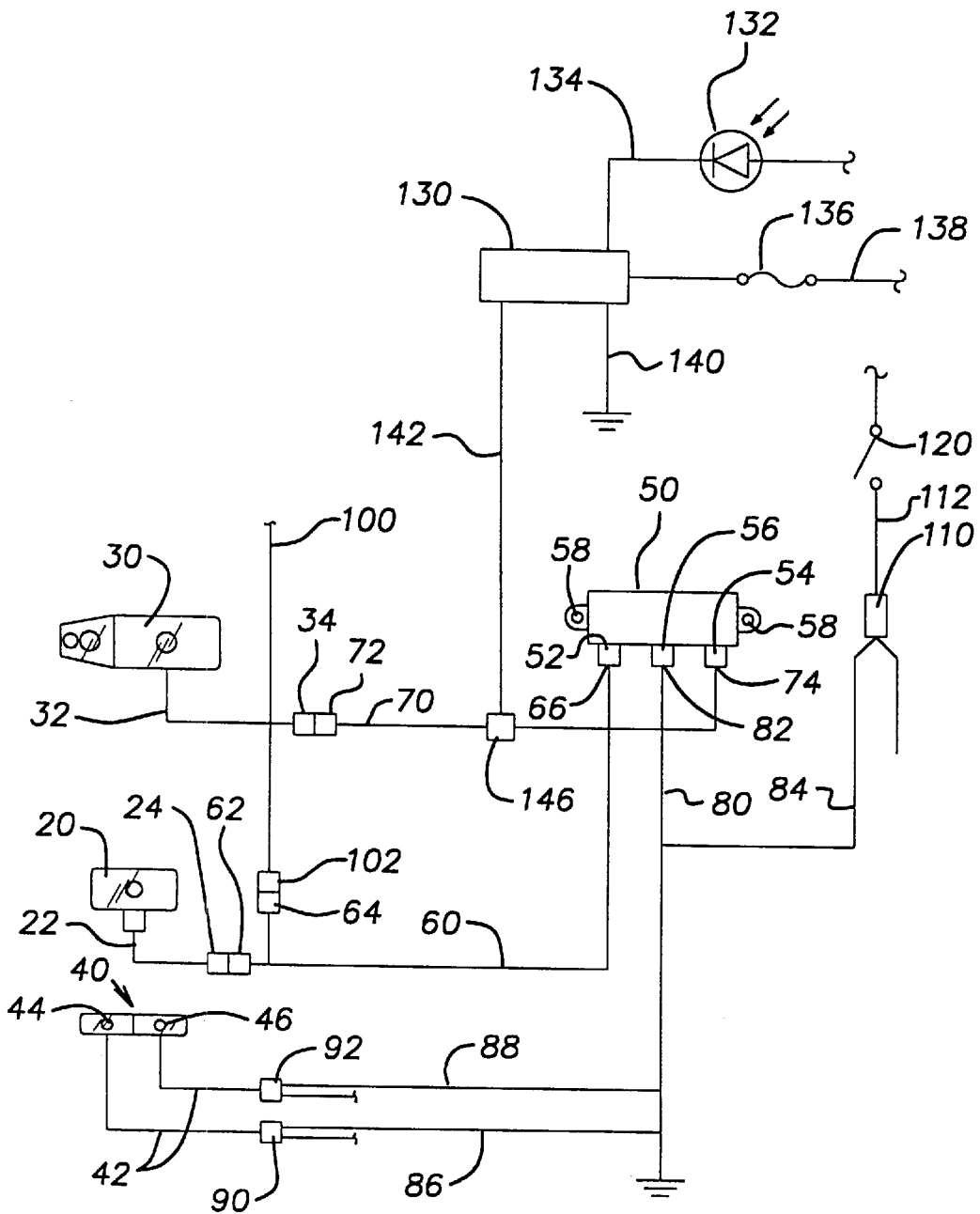
FIG. 2 is an electrical schematic drawing of the auxiliary light harness illustrated in FIG. 1 which includes circuitry for daytime running of the auxiliary lights in accordance with the present invention.

Referring now to FIG. 2, a partial schematic drawing of the auxiliary harness 10 incorporating a DRL (Daytime Running Light) circuit 130. DRL circuit 130 is designed to energize auxiliary lights 30 during daytime operation of the vehicle. DRL circuit 130 receives power from wire 138 which is connected to a power source such as the vehicle battery. A fuse 136 is inserted in wire 138 to protect DRL circuit 130 and the vehicle electrical system from a power surge. DRL circuit 130 is also connected to a light sensor 132 by wire 134. Light sensor can be any device that generates a signal when exposed to a light source. Preferably the light sensor produces an electrical signal when exposed to natural light. One such light sensor is a photo-electric diode. Light sensor 132 can be integrated in DRL circuit 130 or be a separate and/or remote component. Preferably, light sensor 132 is the originally installed sensor in the vehicle which operates the daytime running lights of the vehicle. If the originally installed sensor is used, light sensor wire 134 is connected to the sensor, preferably by a splice. DRL circuit is grounded to the vehicle by ground wire 140. The ground wire serves to protect the DRL circuit during operation. DRL circuit 130 is designed to modify the power from the vehicle power supply to the auxiliary headlights to reduce the intensity of the auxiliary headlights during daytime running. The power from DRL circuit 130 is supplied by DRL wire 142 which connects to harness auxiliary light wiring 70. Preferably connector 146 is a splice.

Figure 3:
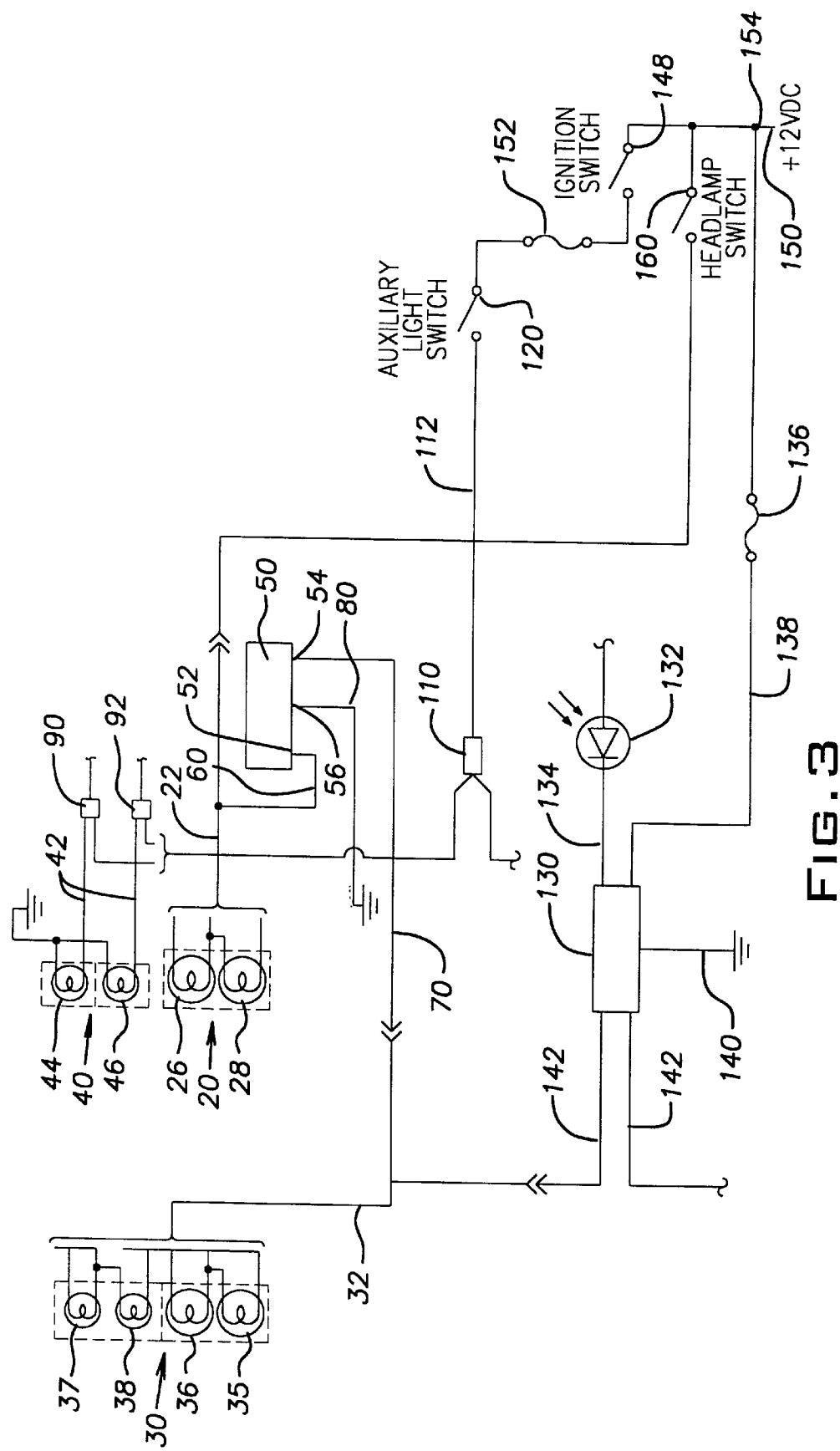
FIG. 3 is a electrical schematic drawing illustrating the circuit of FIG. 2 controlling one vehicle headlight and one auxiliary headlamp.

Referring now to FIG. 3, a more detailed diagram is illustrated as to how the headlights, turn lights, emergency lights, auxiliary lights, and DRL circuit are electrically connected together. In particular, auxiliary light switch 120 is connected in series to the vehicle ignition switch 148. By connecting the auxiliary light harness 10 in such fashion, auxiliary lights 30 cannot be activated before the ignition switch of the vehicle is engaged. This connection arrangement is different from the vehicle headlight switch 160 connection wherein headlights 20 can be activated independently of the engagement of ignition switch 148. As can be appreciated, auxiliary lights 30 are prevented from draining the power from the vehicle battery. This arrangement is very beneficial in that the auxiliary lights 30 typically draw substantially more power than standard headlights, and thus can drain a vehicle's battery in a substantially shorter time than the vehicle's headlights. However, after an operator activates the ignition switch of the vehicle thereby causing the vehicle engine to run, the power generated by the engine is more than sufficient to power the auxiliary lights, thus preventing the power drain of the vehicle battery by the auxiliary lights.

Switching wire 112 is shown to be connected to one end of auxiliary light switch 120. The other end of auxiliary light switch 120 is connected by a light switch wire 122 to a fuse158. The specific fuse selected is to be in series with ignition switch 148 of the vehicle so as to prevent current from passing through switching wire 112 until both auxiliary light switch 120 and ignition switch 148 are activated.

A standard dimmer switch, not shown, is connected in series with headlamp switch 160. The dimmer switch is used to activate the low beam light 26 and the high beam light 28 of headlight 20 and the low beam light 35 and high beam light 36 of auxiliary light 30.

Control module 50 is designed to activate the auxiliary lights 30 and deactivate headlights 20 of a vehicle when auxiliary light switch 120 and ignition switch 148 are activated. When ignition switch 148 and/or auxiliary light switch 120 are deactivated, headlights 120 are automatically reactivated and auxiliary lights 30 are automatically deactivated.

Switch wire 112 receives current from power source 150 when both ignition switch 140 and auxiliary light switch 120 are activated. Switch wire 112 directs current to control module 50 through-module switch port 56. Control module 50 includes solid state switches to control the power to the headlights and/or to the auxillary lights. Auxiliary light harness 10 is designed such that when auxiliary light switch 120 and/or ignition switch 148 are not switched on, the solid state switches in control module 20 are in their initial contact position. In such a position, the headlights 20 of the vehicle operate in their standard manner, and the auxiliary lights 30 are deactivated. In this mode of operation, the headlights 20 of the vehicle operate in their standard fashion along with the operation of the turn/emergency lights 40 of the vehicle. When the operator activates the ignition switch 148 by turning on the vehicle and also activating auxiliary light switch 120, which is typically located in the driving compartment of the vehicle, current is directed through switch wire 112 into control module 50. The current passing through switch wire 112 in turn causes the solid state switches in the control module 50 to move to the activated position. In such a position, the power to the vehicle's headlights is rerouted to the auxiliary lights 30 of the vehicle. This rerouting of power causes the headlights of the vehicle to become deactivated and the auxiliary lights 30 to become activated.

As can be appreciated, when headlight switch 160 is deactivated, the headlights 20 of the vehicle are off, since no power is connected to the headlights. In addition, when headlamp switch 160 is deactivated, the auxiliary lights 30 cannot be activated since headlight switch 160 controls the power flow through OEM wiring 100. Consequently, the auxiliary lights 30 cannot be activated until headlight switch 160, ignition switch 140 and auxiliary switch 120 are all activated. The wiring of control module 50 is designed such that the signal caused by a dimmer switch is received by auxiliary lights 30 the same as when the headlights 20 are activated. Consequently, the dimmer switch controls the low beam light 35 and the high beam light 36 of auxiliary light 30 in a similar manner as when the dimmer switch controls the low beam light 26 and the high beam light 28 of headlight 20. Auxiliary light harness 10 also taps into the power from turn/emergency light wiring 42 to auxiliary light 30. However, unlike the circuitry between the vehicle headlights and the auxiliary lights, auxiliary light harness 10 does not deactivate the vehicle's turn signals or the vehicle's emergency lights when the auxiliary lights are activated. When the vehicle turn signal and/or the vehicle emergency light is activated, harness turn light wire 86 and harness emergency light wire 88 route such signals from turn/emergency light wiring 42 through harness control module 50 and into auxiliary turn light 37 and auxiliary emergency light 38 of auxiliary 30 to thereby cause such lights to activate simultaneously with the vehicle's turn light 44 and/or emergency light 46.

Referring now to FIGS. 2 and 3, DRL circuit 130 is designed to operate only during day light hours. The DRL circuit is also designed to operate the auxiliary lights in daytime running mode when auxiliary light switch 120 is deactivated. DRL wire 142 is connected in parallel to harness auxiliary light harness wiring 70. By connecting DRL wire 142 in parallel to harness wiring 70, DRL circuit only controls the power to auxiliary lights 30 when power is not flowing through harness wiring 70. When power is flowing through harness wiring 70, full power is transferred to auxiliary lights 30 irrespective of the low power being generated by DRL circuit 130 and through DRL wire 142. As can be appreciated, DRL wire 142 can be connected to harness wiring 60, 70 and/or 80 in other ways to supplement, reduce and/or control the power flowing in the harness wiring to control the auxiliary lights during daytime running. DRL circuit 130 can also be designed to deactivate when auxiliary light switch 120 and/or headlamp switch 160 is activated.

Figure 4:
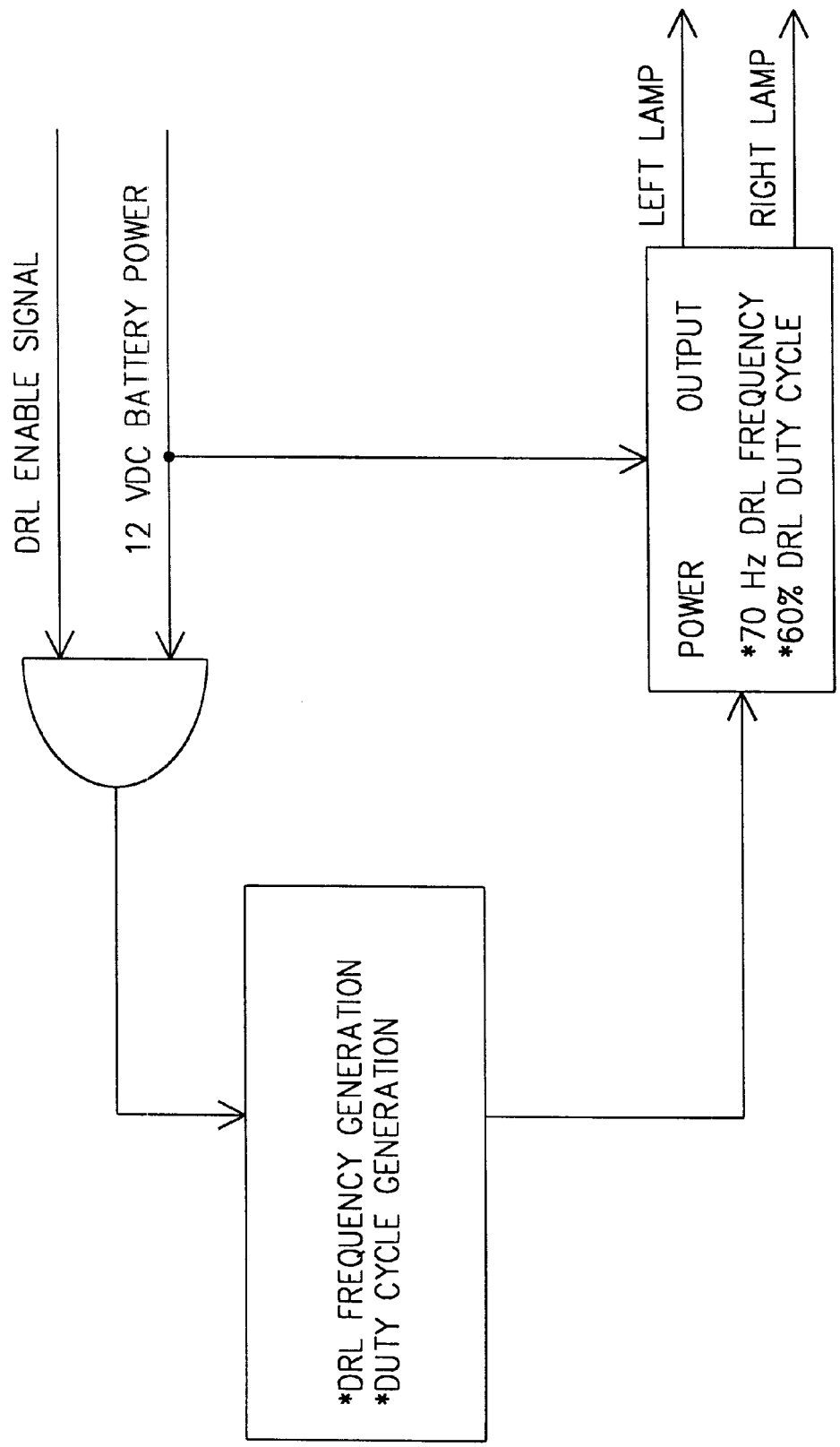
FIG. 4 is a block diagram of the daytime running light control of the present invention.

Referring now to FIG. 4, DRL circuit 130 to shown to send a power signal to the auxiliary light only when a signal is received from a DRL enable signal, such as produced by light sensor 132, and when power is received from the vehicle power source, such as the vehicle battery. When these two signals are received, a power frequency generator generates a signal which is sent to a power output controller. The power output controller reduces the power received from the vehicle power source as a function of the signal receive from the power frequency generator. The reduced power is then directed to the auxiliary lights to energize the auxiliary lights at reduced power for daytime running. The reduction in power is typically between 10 to 50 percent; however, the reduction in power may be some other percentage. Preferably, the power reduction is about 12 to 25 percent. In one embodiment, the DRL circuit generates a 60 percent DRL duty cycle. The duty cycle is produced from a 70 Hz DRL frequency that is generated by the power frequency generator. The DRL frequency can be formed by a pulse width modulator of similar device.

Figure 5:
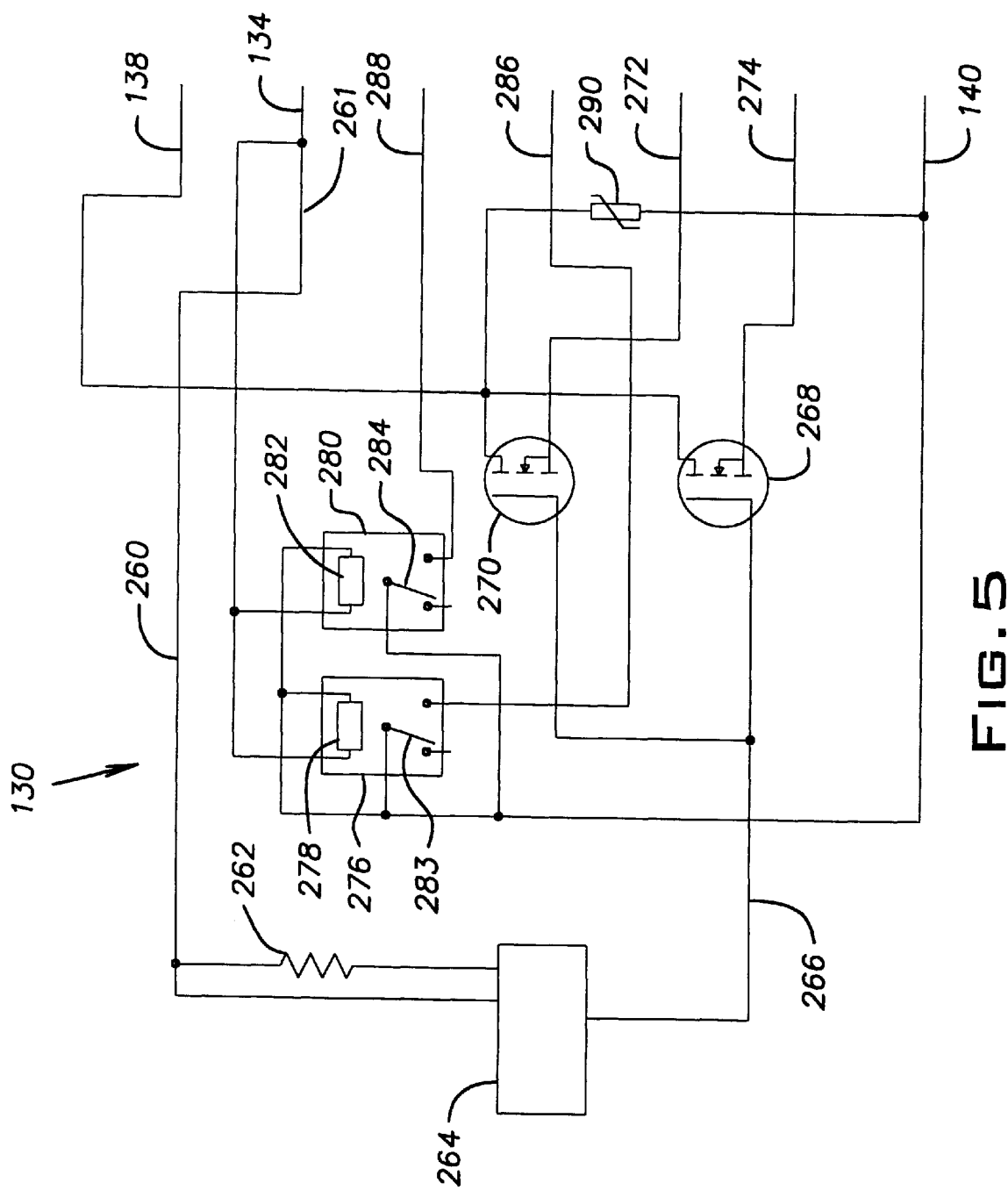
FIG. 5 is a electrical schematic drawing of a circuit used for the daytime running light control.

Referring now to FIG. 5, the simplified operation of solid state DRL circuit is illustrated. DRL circuit 130 receives a DRL signal through sensor wire 134. The signal from sensor wire 134 is typically a 5 volt signal. The signal from sensor wire is split by wires 260, 261. Wire 260 sends the signal into oscillator 264. Part of the signal in wire 260 is sent through resistor 260 and into oscillator 264. Resistor 262 is designed to set the signal frequency of the signal produced by oscillator 264 which in turn sets the duty cycle of the power from DRL circuit 130. Resistor 262 can be a set value or a variable resistor that can be manually or automatically adjusted. The operation of oscillator 264 and the control of the generated frequency of the oscillator by resistor 262 is known in the art and will not be further described. The signal generated by oscillator 264 is sent by wire 266 to transistors 268, 270. The transistors are preferably MOSFET devices; however, other types of transistors can be used. Transistors 268, 270 act as gates to the current from the vehicle power supply that is flowing through power source wire 138 into wires 272, 274. The frequency at which the transistors allow current to pass from wire 138 into wires 272, 274 is a function of the signal sent to transistors 268, 270 by wire 266. Typically the signal in wire 266 has a frequency of about 70 to produce a power duty cycle of about 60; however, the frequency may be higher or lower to obtain a desired power duty cycle. As shown in FIG. 5, switches or relays 276, 280 isolate DRL circuit 130 from the auxiliary lights when a signal in wire 134 is not detected. When a signal is sent by wire 134, the signal is received in wire 260 and sent to switches 276, 280. Switches 276, 280 include switch controllers 278, 282 that move a switch blade 283, 284 in each switch to contact wire 286, 288. The movement of the switch blades into contact with wires 286, 288 completes the circuit with the auxiliary lights thereby causing the auxiliary lights to energize based upon the duty cycle produced by the DRL circuit. Wire 272, 274, 286, 288 all form the DRL wire 142 from DRL circuit 130. When the signal from wire 134 terminates, switch controllers 278, 282 allow the switch blades to move back to their steady state position thereby again isolating DRL circuit from the auxiliary lights. DRL circuit also includes a power surge 290 which is connected to ground wire 140. Power surge 290 protects the transistors, switches, oscillator and other components of the DRL circuit from damage due to a power spike or short in the electrical system.

Referring now to FIGS. 1, 2 and 3, auxiliary light harness 10 has a modular design in that the various components can be connected, replaced, and/or repaired without having to completely dissemble and/or remove the harness from the vehicle. The solid state construction of the control module simplifies the wiring of the electrical harness, and ensures the desired operation of the headlights of the vehicle and the auxiliary lights of the vehicle occurs during an emergency or some unforeseen circumstance. The reduced number of wires through the fire wall of the vehicle and into the driving compartment of the vehicle also simplifies installation of the harness, and simplifies and reduces the time for maintenance and repair of the vehicle, and further reduces unnecessary damage to the vehicle. As shown in FIG. 1, switching wire 112 is a single wire that connects to switch 120. Consequently, only a small hole is needed through the fire wall of the vehicle to connect switch wire 112 to switch 120, thus significantly simplifying installation and repair of the auxiliary light harness. Switch 120 preferably includes an indicator, such as a light, to notify a vehicle operator of the position of switch 120. As can be appreciated, the majority of the wiring of the harness, the control modules of the harness, the switch of the harness, and the DRL circuit can remain in the vehicle from season to season, even though the auxiliary lights are periodically removed, reinstalled and/or replaced on the vehicle. This can be accomplished by simply disconnecting auxiliary light connector 34 from harness auxiliary light wire connector 72 and dismounting the auxiliary light from the vehicle. When the auxiliary light once again is to be reinstalled, connector 34 of the auxiliary light is simply reconnected to the harness auxiliary light connector 72. As previously indicated, control module 50 includes a module mount hole 58 to allow the two control modules to be secured in the interior of a vehicle by bolts, screws or the like. The wiring for the electrical harness is preferably secured by ties, clamps and the like to ensure that the wiring is secured in place during the operation of the vehicle. The wiring that typically remains in the vehicle includes harness wiring 60 and 70 and connectors thereto, and the harness switch wiring 80 and related circuitry. The DLR circuit and the wires connected thereto are also designed to remain in a vehicle throughout the year. Referring now to FIGS. 6 and 7, the DRL circuit in housed in a protective housing 290. The housing protects the circuitry from corrosion and from foreign materials that can interfere with the operation of the circuit. Housing 290 includes two openings 292 for mounting the DRL circuit in the vehicle. Preferably, the DRL circuit is mounted near one of modules 50.

Figure 8:
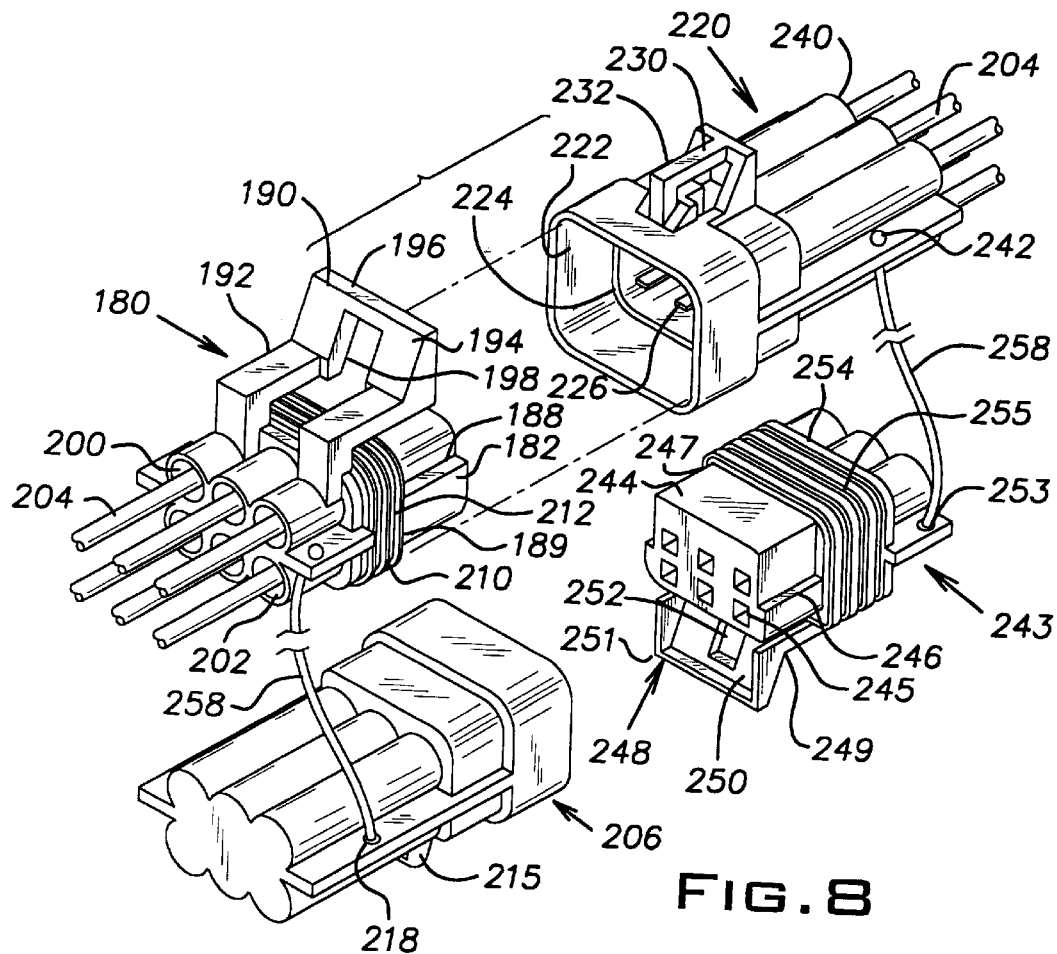
FIG. 8 is a side elevation view of a connector and a connector plug in accordance with the invention.

The integrity of the auxiliary light harness 10 is maintained by several seals which are utilized at the connections with the control module, with the connection between the auxiliary light connector 34 and harness headlight connector 62, and with the connection between wires 143, 138, 140, 272, 274, 286, 288 and 290 of the DRL circuit. As can be appreciated, a similar seal construction can be created for harness headlight power connector 64 and OEM light wiring connector 102. Referring now to FIGS. 6–9, a seal connector 170 is illustrated. Seal connector 170 is specifically illustrated as being used with the DRL circuit; however, the same type of seal connector is preferably to connect the wiring to the control module and the auxiliary lights to the auxiliary light harness. Seal connector 170 includes a male connector 180 and a female connector housing 220. As best shown in FIG. 8, male connector housing 180 includes a neck portion 182 designed to be telescopically inserted into female connector housing 220. At the front end of neck portion 182 is a plurality of neck openings 183. Positioned inside of each of the neck openings is a conductor socket 184. Each conductor socket 184 is secured in place by a socket lock tab 185. Each conductor socket includes a socket contact 186 designed to engage a conducting pin when positioned in female connector housing 220.

The neck portion 182 of male connector housing 180 includes one or more neck ridges 188. These neck ridges define a particular shape of the outer surface of the neck portion so as to only allow the neck portion to be inserted in one specific manner into female connector housing 220 so as to ensure the proper electrical connection between the male connector housing 180 and the female connector housing 220.

Neck portion 182 also includes a seal surface 189 which supports a seal 210. Seal 210 includes a plurality of seal ribs 212. Seal 210 is designed to create a seal between neck portion 182 of male connector housing 180 and female connector housing 220 when the neck portion is telescopically inserted into female connector housing 220. The seal prevents and/or inhibits liquids, dust, dirt and the like from coming into contact with the conducting sockets 184 in male connector housing .180 and conductor pins 268 in female connector housing 220. The seals inhibit and/or prevent the conductor sockets and the conductor pins from corroding or allowing foreign materials to interfere with the electrical connection between the conducting sockets and the conductor pins when the male and female connector housings are connected together.

Positioned adjacent to the rear of neck portion 182 of male connector housing 180 is a lock latch 190. Lock latch 190 includes two latch arms 192. Connected between the two latch arms is a latch handle 194. The latch handle 194 includes a handle bar 196 and a slot 198. Latch arms 192 are made of material which is flexible to allow the latch handle to be lifted.

The rear of male connector housing 180 includes a plurality of connector rear openings 200. The openings are sized to allow wire 204 to pass through the openings. Wire seal 197 seals wire 204 within rear opening 200 so as to inhibit and/or prevent liquids, dust, dirt and the like from entering the rear opening and corroding and/or interfering with the electrical connections with conducting socket 184.

A security cable opening 202 is positioned adjacent to the rear openings of the male connector housing. Security cable opening 202 is designed to receive security cable 258. Connected to the other end of security cable 258 is male seal connector 206. Male seal connector 206 includes a connector cavity which is designed to receive neck portion 182 and seal 210 on male connector housing 180. Inside connector cavity 208 is a positioning cavity 214 which is designed to allow neck portion 182 to be inserted into connector cavity 208 in only the proper manner. Male seal connector 206 also includes a lock tab 215. Connected to lock tab 215 is a tab guide 216 and a tab landing 217. Male seal connector 206 also includes a security cable opening 218 which receives the second end of security cable 258. The security cable 202 and male seal connector 206 are typically not use in the DRL circuit since the male and female connector housing should be connected together at all times unless a repair is to be made to the DRL circuit or related wiring.

Female connector housing 220 includes a connector cavity 222 at the front of the female connector housing. Connector cavity 222 has a cross sectional shape and size which is designed to receive neck portion 182 of male connector housing 180. Within connector cavity 222 is a positioning cavity 224. Positioning cavity 224 is sized and shaped to specifically telescopically receive a portion of neck portion 182 such that male connector hosing 180 can only be connected to female connector housing 220 in a certain manner.

Also positioned within connector cavity 222 are a plurality of conducting pins 226. Each conducting pin 226 is secured within female connector housing 220 by pin lock tabs 228.

The top of female connector housing 220 includes a lock tab 230. Lock tab 230 includes a tab guide 232 which is adapted to slide through handle slot 198 on male connector housing 180 when male connector housing 180 is telescopically inserted into connector cavity 222 of female connector housing 220. Lock tab 230 also includes a tab landing 234 which engages a portion of latch handle 194 on male connector housing 180 to secure male connector housing 180 and female connector housing 220 together once male connector housing 180 is fully inserted in female connector housing 220.

The rear of female connector housing 220 includes a plurality of connector rear openings 240. Latch handle 194 can be lifted to be disengaged from the landing 234 to allow male and female connector housings to be disengaged from one another. Positioned in each of the rear openings is a wire 204 which connects to the end of conductor pins 226. Wire seal 241 seals the space between wire 204 and rear opening 240 to prevent liquids, dust, dirt and the like from corroding and/or interfering with the electrical connection between conducting pin 226 and conducting sockets 184.

Positioned adjacent to connector rear openings 240 is a security cable opening 242. Security cable opening 242 receives one end of security cable 258. The second end of security cable 258 is connected to security cable opening 253 of female seal connector 243. Female seal connector 243 includes a neck portion 244 which is designed to be telescopically inserted into connector cavity 222 of female connector housing 220. The front of female seal connection 243 includes a neck portion 244. At the front end of neck portion 244 is a plurality of neck openings 245 which are designed to receive conducting pin 226 within connector cavity 222 of female connector housing 220 when female seal connector 223 is inserted into connector cavity 222. Neck portion 244 of female seal connector 243 includes a neck ridge 246. Neck ridge 246 is designed to provide neck portion 244 with a distinct cross sectional shape such that female seal connector 243 can only be inserted one way into connector cavity 222, to thereby ensure the proper insertion of female seal connector 243 into female connector housing 220. One portion of the neck portion 244 includes a seal surface 247. Seal 254 is positioned on seal surface 247. Seal 254 includes a plurality of seal ribs 255 which are designed to create a seal between neck portion 244 and the inner surface of connector cavity 222 to inhibit and/or prevent liquids, dust, dirt and the like from corroding and/or otherwise damaging or interfering with electrical connections provided by conductor pins 226. Female seal connector 243 includes a lock latch 248. Lock latch 248 includes two flexible latch arms 249 and a latch handle 250 connected there between. Latch handle 250 includes a handle bar 251 and a handle slot 252. The security cable 258 and female seal connector 243 are typically not use in the DRL circuit since the male and female connector housing should be connected together at all times unless a repair is to be made to the DRL circuit or related wiring.

Figure 9:
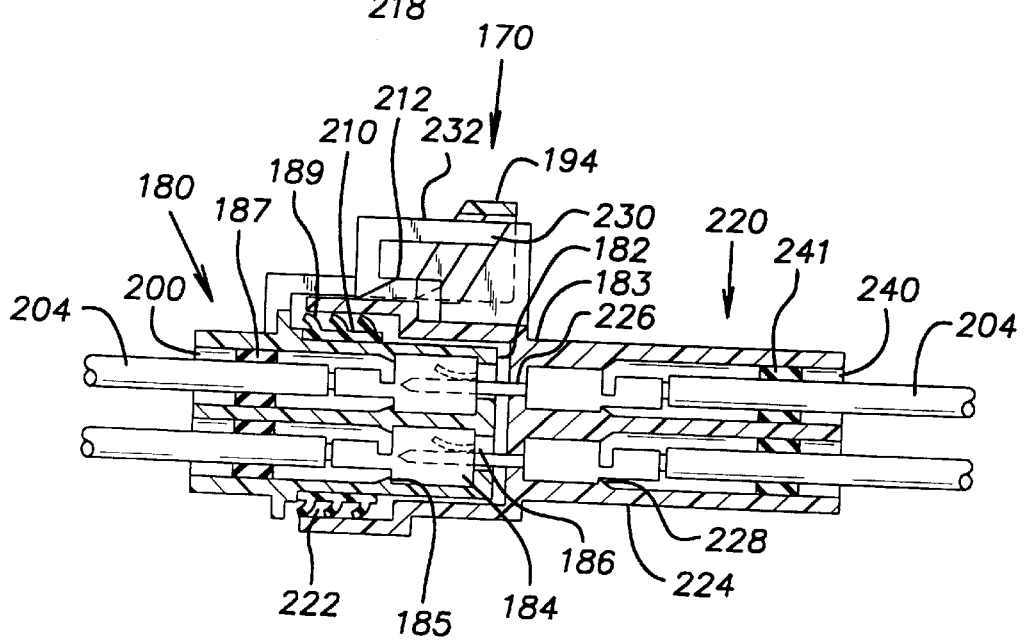
FIG. 9 is a cross sectional view of the connector and connector plug of FIG. 8 connected together.

As best shown in FIG. 9, the bottom portion of latch handle 194 of lock latch 190 on male connector housing 180 engages tab landing 234 on female connector housing 220 thereby securing female connector housing and male connector housing together. When male connector housing 180 and female connector housing 220 are connected together, conducting pins 226 electrically engage with the corresponding conducting sockets 184 thereby forming the desired electrical connection. Seals 187, 210 and 241 ensure that liquids, dust, dirt and the like are inhibited and/or prevented from entering the interior components of the connectors so as to prevent such materials from damaging the conducting pins and/or conducting sockets while female connector housing and male connector housing are connected together.

Referring now to FIGS. 8 and 9, seal 210 includes a plurality of ribs 220 which contact the interior surface of conductor cavity 222 to form the seal between neck portion 182 of male connector housing 180 and conductor cavity 222 of female connector housing 220. Seal 210 is preferably made of a flexible plastic material, flexible rubber material or other flexible material which allows seal ribs 212 to compress and/or flex when such seal ribs contact the interior of connector cavity 222 to thereby provide the desired seal.

As can be appreciated, when male connector housing 180 is removed from female connector housing 220, such as when auxiliary light 30 is disconnected from the auxiliary light harness, the connectors at one end of the auxiliary light harness and at one end of the auxiliary light can be sealed so as to prevent the electrical connectors from becoming damaged while unconnected. Male seal connector 206 is designed so as to connect to and secure to male connector housing 180 in a similar fashion as female connector housing 220 would connect to male connector housing 180. Similarly, female seal connector 243 connects to female connector housing 240 in a similar fashion as male connector housing 180 would connect to female connector housing 220. When male seal connector 206 is connected to male connector housing 180, seal 210 on male connector housing 180 forms a seal between the interior of connector cavity 208 of male seal connector 206 and neck portion 182 of male connector housing 180. This seal inhibits and/or prevents liquids and/or other materials from damaging conductor sockets 184 from becoming corroded or otherwise damaged. Female seal connector 243 includes a seal 254 to thereby form a seal between neck portion 244 of female seal connector 243 and the inner surface of conductor cavity 222 of female connector housing 220 when female seal connector 243 is connected with female connector housing 220. This seal inhibits and/or prevents liquids and/or other materials from damaging the conducting pins 226 within female conductor housing 220 as long as female seal connector 243 is connected to female connector housing 220. Both male seal connector 206 and female seal connector 243 can easily be removed from male connector housing 180 and female connector housing 220, respectively, to once again allow male connector 180 to be connected to female connector housing 220.

The invention has been described with reference to preferred and alternate embodiments. Modifications and alterations will become apparent to those skilled in the art upon reading and understanding the detailed discussion of the invention provided for herein. This invention is intended to include all such modifications and alterations insofar as they come within the scope of the present invention.

Having thus described the invention, it is claimed:

1. A light circuit to alter the power to an auxiliary light connected to a vehicle having headlights, said light circuit comprising:
   a) an auxiliary light connector to connect to said auxiliary light;
   b) a power connector to connect to a power source;
   c) a daytime running light circuit to detect a signal generated by a light sensor, said light sensor detecting the existence of sunlight and generating a signal upon detection of sunlight; and
   d) a controller to control power from said power source to said auxiliary light base up to said signal detected by said daytime running light circuit, said power received by said auxiliary light directed from said controller energizing said auxiliary light to produce a lumen intensity up to about the lumen intensity of said headlights in low beam mode.

2. A light circuit as defined in claim 1, wherein said controller directs power from said power source to said auxiliary light.

3. A light circuit as defined in claim 2, wherein said controller terminates said power to said auxiliary light when not receiving a signal from said daytime running light circuit.

4. A light circuit as defined in claim 2, wherein said power received by said auxiliary light directed from said controller sufficient to energize said auxiliary light to produce a lumen intensity less than said lumen intensity of said headlights in low beam mode.

5. A light circuit as defined in claim 4, wherein said power received by said auxiliary light directed from said controller sufficient to energize said auxiliary light to produce a lumen intensity of 50–90% of said lumen intensity of said headlights in low beam mode.

6. A light circuit as defined in claim 2, wherein said power terminates to said auxiliary light when said auxiliary light is powered by another power circuit.

7. A light circuit as defined in claim 1, wherein said controller diverts power from said power source away from said auxiliary light.

8. A light circuit as defined in claim 7, wherein said controller terminates said power to said auxiliary light when not receiving a signal from said daytime running light circuit.

9. A light circuit as defined in claim 7, when said controller is a solid state circuit.

10. A light circuit as defined in claim 7, wherein said power terminates to said auxiliary light when said auxiliary light is powered by another power circuit.

11. A light circuit as defined in claim 7, wherein said power received by said auxiliary light directed from said controller sufficient to energize said auxiliary light to produce a lumen intensity less than said lumen intensity of said headlights in low beam mode.

12. A light circuit as defined in claim 11, wherein said power received by said auxiliary light directed from said controller sufficient to energize said auxiliary light to produce a lumen intensity of 50–90% of said lumen intensity of said headlights in low beam mode.

13. A light circuit as defined in claim 7, wherein said controller periodically grounds said power source to divert power from said auxiliary light.

14. A light circuit as defined in claim 1, wherein said controller includes a power modifier to reduce the power from said power source to said auxiliary light.

15. A light circuit as defined in claim 4, wherein said power modifier includes a pulse width modulator.

16. A light circuit as defined in claim 15, wherein said controller terminates said power to said auxiliary light when not receiving a signal from said daytime running light circuit.

17. A light circuit as defined in claim 16, including a variable resistor to control the degree of power reduction resulting from said power modifier.

18. A light circuit as defined in claim 17, when said controller is a solid state circuit.

19. A light circuit as defined in claim 18, wherein said power terminates to said auxiliary light when said auxiliary light is powered by another power circuit.

20. A light circuit as defined in claim 14, wherein said controller terminates said power to said auxiliary light when not receiving a signal from said daytime running light circuit.

21. A light circuit as defined in claim 14, said controller including a variable resistor to control the degree of power reduction resulting from said power modifier.

22. A light circuit as defined in claim 14, wherein said power received by said auxiliary light directed from said controller sufficient to energize said auxiliary light to produce a lumen intensity less than said lumen intensity of said headlights in low beam mode.

23. A light circuit as defined in claim 22, wherein said power received by said auxiliary light directed from said controller sufficient to energize said auxiliary light to produce a lumen intensity less than said lumen intensity of said headlights in low beam mode.

24. A light circuit as defined in claim 14, wherein said power modifier includes a pulse width modulator.

25. A light circuit as defined in claim 1, wherein said controller terminates said power to said auxiliary light when not receiving a signal from said daytime running light circuit.

26. A light circuit as defined in claim 1, when said controller is a solid state circuit.

27. A light circuit as defined in claim 26, wherein said power terminates to said auxiliary light when said auxiliary light is powered by another power circuit.

28. A light circuit as defined in claim 1, wherein said power received by said auxiliary light directed from said controller sufficient to energize said auxiliary light to produce a lumen intensity less than said lumen intensity of said headlights in low beam mode.

29. A light circuit as defined in claim 28, wherein said power received by said auxiliary light directed from said controller sufficient to energize said auxiliary light to produce a lumen intensity of 50–90% of said lumen intensity of said headlights in low beam mode.

30. A light circuit as defined in claim 1, wherein said controller is connected in parallel to an auxiliary light harness.

31. A light circuit for connecting an auxiliary light to a vehicle headlight system and to operate the auxiliary lights at reduced power during the daytime, said vehicle headlight system includes a headlight and a headlight plug which supplies power to said headlight, said headlight having a low beam mode of operation, said light circuit comprising:
 a) a headlight connector designed to replace said headlight plug and to connect to said headlight;
 b) a power connector designed to connect to said headlight plug;
 c) an auxiliary light connector designed to connect to an auxiliary light;
 d) a light selection switch designed to create an electrical signal indicating selection of said auxiliary light and/or said headlight;
 e) a control module to at least periodically monitor said electrical signal from said switch and to direct power to said auxiliary light and/or said headlight;
 f) a daytime running light circuit to receive a signal generated by a light sensor; and
 g) a controller to control power from a power source to said auxiliary light base up to the signal received by said daytime running light circuit, said controller directing power from said power source to said auxiliary light when said daylight signal receiver receives a signal from said light sensor.

32. A light circuit as defined in claim 31, including a turn signal connector to connect to a turn signal light of said vehicle, said turn signal connector connected to said control module.

33. A light circuit as defined in claim 31, wherein said control module includes a sealing arrangement to inhibit interference with electrical signals to and/or from said control module.

34. A light circuit as defined in claim 33, wherein said sealing arrangement comprising a male connector, a female connector and a flexible seal, said flexible seal positioned at least partially between said male and female connector when said male connector is inserted into said female connector.

35. A light circuit as defined in claim 34, wherein said female connector includes a housing to at least partially telescopically receive a portion of said male connector.

36. A light circuit as defined in claim 34, wherein said flexible seal is positioned on said male connector, said flexible seal substantially surrounding an outer surface of said male connector.

37. A light circuit as defined in claim 33, wherein said male and female connectors include a locking arrangement to secure together said male and female connectors.

38. A light circuit as defined in claim 37, wherein said locking arrangement includes a locking tab on said female connector and a substantially flexible release tab on said male connector.

39. A light circuit as defined in claim 33, wherein said flexible seal includes at least one corrugation.

40. A light circuit as defined in claim 31, wherein said controller diverts power from said power source away from said auxiliary light.

41. A light circuit as defined in claim 31, wherein said controller including a power modifier to reduce the power from said power source to said auxiliary light.

42. A light circuit as defined in claim 41, wherein said power modifier includes a pulse width modulator.

43. A light circuit as defined in claim 41, said controller includes a variable resistor to control the degree of power reduction resulting from said power modifier.

44. A light circuit as defined in claim 31, wherein said controller terminates said power to said auxiliary light when not receiving a signal from said daytime running light circuit.

45. A light circuit as defined in claim 31, wherein said controller disconnects said power source from said auxiliary light when not receiving a signal from said daytime running light circuit.

46. A light circuit as defined in claim 31, wherein said power received by said auxiliary light directed from said controller energizing said auxiliary light to produce a lumen intensity up to about the lumen intensity of said headlight in said low beam mode.

47. A light circuit as defined in claim 46, wherein said power received by said auxiliary light directed from said controller sufficient to energize said auxiliary light to produce a lumen intensity less than said lumen intensity of said headlights in low beam mode.

48. A light circuit as defined in claim 47, wherein said power received by said auxiliary light directed from said controller sufficient to energize said auxiliary light to produce a lumen intensity of 50–90% of said lumen intensity of said headlights in low beam mode.

49. A light circuit as defined in claim 31, wherein said controller is a solid state circuit.

50. A light circuit as defined in claim 31, wherein said power terminates to said auxiliary light when said auxiliary light is powered by another power circuit.

51. A light circuit as defined in claim 31, wherein said controller is connected in parallel to an auxiliary light harness.

52. A light circuit that is used in conjunction with an auxiliary light harness to selectively direct power to an auxiliary light connected to a vehicle, said vehicle including at least one headlight having a low beam mode of operation, said light circuit comprising:

a) a daytime running light circuit to receive a signal generated by a light sensor, said light sensor detecting the existence of sunlight and generating a signal to said daytime running light circuit upon detection of sunlight; and b) a controller to control power the amount of power directed to said auxiliary light, said power to directed to said auxiliary light dependent on said signal detected by said daytime running light circuit, said controller directing a reduced amount of power to said auxiliary light at least when said light sensor sends a signal to said daylight signal receiver, said reduced amount of power to said auxiliary light energizing said auxiliary light to produce a lumen intensity that is less than lumen of said headlight in said low beam mode.

53. A light circuit as defined in claim 52, wherein said power received by said auxiliary light directed from said controller sufficient to energize said auxiliary light to produce a lumen intensity of 50–90% of said lumen intensity of said headlights in low beam mode.

54. A light circuit as defined in claim 52, wherein said controller is connected in parallel to an auxiliary light harness.

55. A light circuit as defined in claim 52, wherein said controller includes a power modifier to reduce the power from said power source to said auxiliary light.

56. A light circuit as defined in claim 52, wherein said controller terminates said power to said auxiliary light when not receiving a signal from said daytime running light circuit.

* * * * *